July 27, 1926.                    1,594,159
E. C. ETCHISON ET AL
CONSTRUCTION OF ENDS OF REELS
Filed June 26, 1925

Inventors
E. C. Etchison,
J. B. McRitchie,
By
Attorney

Patented July 27, 1926.

1,594,159

UNITED STATES PATENT OFFICE.

EUNICE COOK ETCHISON AND JOHN BISIT McRITCHIE, OF FAIRFAX, ALABAMA.

CONSTRUCTION OF ENDS OF REELS.

Application filed June 26, 1925. Serial No. 39,692.

Our invention relates to the construction of the ends or heads of reels such as employed in connection with cotton mill machines.

The leading object of our invention is the provision of a removable steel head or disk designed to take the place of the cast metal head or disk in general and common use and which by experience has been found to become damaged or broken and cause considerable inconvenience and expense.

Another object of our invention is the production of a steel head or disk which will perform its functions in an efficient and practical manner, which can be easily applied and removed when necessary, and which by reason of its durability will prove a great saving in time, labor and expense, and thus insure a desirable and practical device.

To attain the desired objects, our invention consists of a disk or head of the character and for the purpose stated embodying novel features of construction and combination of parts, substantially as described and claimed and as shown in the accompanying drawing, in which:—

Our invention is of the simplest possible construction and consists of the flat circular disk or head A, made of steel of the proper size, weight and thickness and formed with the opening B, which receives the end of the hollow shaft or spindle C, which is formed with threaded sockets D, to receive the threaded bolts E, which also serve to secure the belt or pulley wheel element F in position, and which in connection with the rivet fasteners G serves to make the complete structure.

Figure 4:
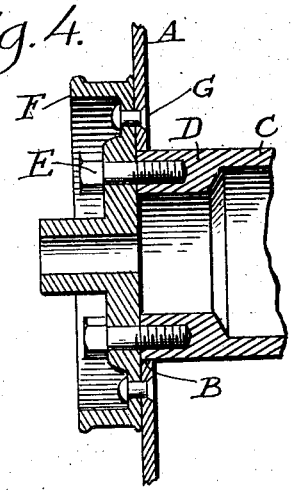
Fig. 4 represents a sectional view of one end of the disk, pulley wheel, and shaft.

According to our invention, the shaft, the pulley head and the disk or head are connected, as shown in Fig. 4, to make a complete unit, and a strong and durable construction is provided which at the same time will permit removal of the parts when found necessary, and by making the head or disk of steel and the parts separate we provide a device which will overcome the objections and defects found to exist in the present cast-metal structures, and insure a practical, efficient and time, labor and money-saving improvement.

Figure 1:
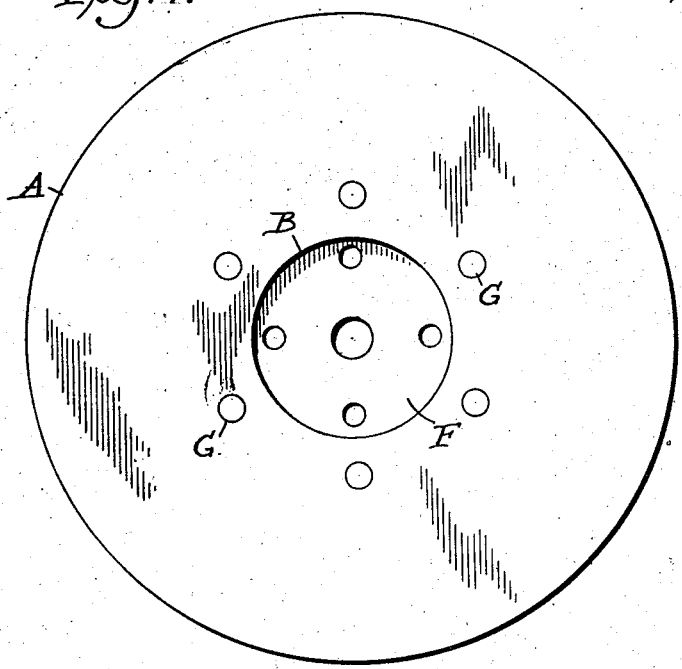
Figure 1 represents an elevation of the head or disk looking toward the inner face thereof.
Figure 2:
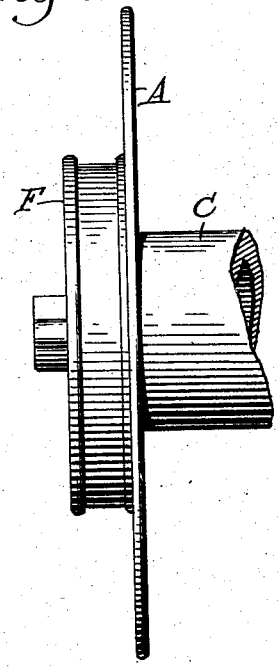
Fig. 2 represents a view in elevation of the complete head or disk, and a portion of the end of the shaft.
Figure 3:
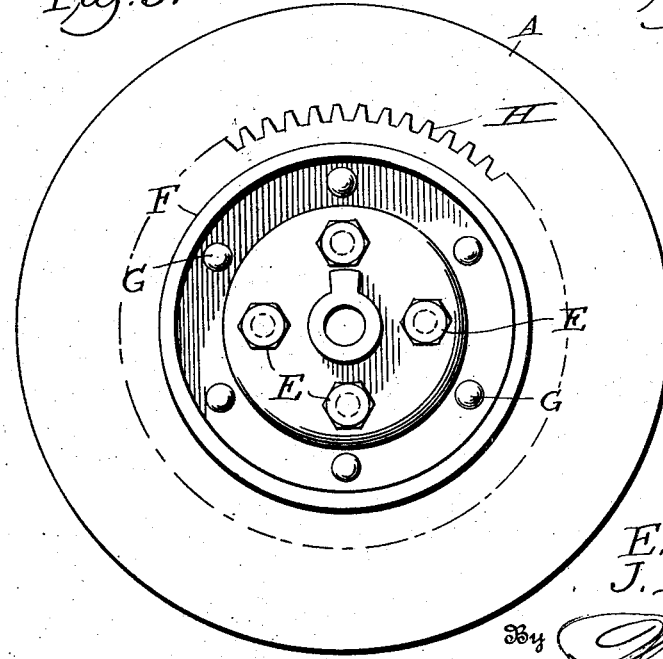
Fig. 3 represents a view in elevation of the head or disk taken from the outer face.

The member or element F may serve as a pulley wheel, or a brake band, or as shown in Figure 3, may be provided with gear teeth H, and serve as a gear wheel, and perform its functions in a practical manner under all conditions.

We claim:

1. The reel structure herein described consisting of the hollow reel shaft having threaded openings in its end, a disk fitting on the end of said shaft, a head fitting against the disk and the end of the shaft, fastenings connecting the head to the shaft and separate fastenings connecting the head to the disk, a flanged rim formed on said head and a hollow shaft nipple extending out from said head.

2. The reel structure herein described consisting of the hollow reel shaft having threaded openings in its end, a disk fitting on the end of said shaft, a head fitting against the disk and the end of the shaft, fastenings connecting the head to the shaft and separate fastenings connecting the head to the disk, a flanged rim formed on said head and a hollow shaft nipple extending out from said head, said flange of the rim being formed with gear teeth.

In testimony whereof we hereunto affix our signatures.

EUNICE COOK ETCHISON.
JOHN BISIT McRITCHIE.